United States Patent

[11] 3,594,061

| [72] | Inventor | John James Selvage<br>Romford, England |
|---|---|---|
| [21] | Appl. No. | 815,153 |
| [22] | Filed | Apr. 10, 1969 |
| [45] | Patented | July 20, 1971 |
| [73] | Assignee | The Rank Organization Limited<br>London, England |
| [32] | Priority | Apr. 11, 1968 |
| [33] | | Great Britain |
| [31] | | 17625/68 |

[54] SIGHTING TELESCOPES WITH DISPLACEABLE EYEGUARDS
1 Claim, 5 Drawing Figs.

[52] U.S. Cl. .................................................. 350/57
[51] Int. Cl. .................................................. G02b 23/16
[50] Field of Search ................................. 350/17, 57, 72, 10, 248, 249, 312, 179, 266, 267

[56] References Cited
UNITED STATES PATENTS

| 1,024,242 | 4/1912 | Atherton | 350/266 |
| 2,537,011 | 1/1951 | Aparicio | 350/312 (UX) |
| 3,233,515 | 2/1966 | Platzer et al. | 350/267 |
| 3,344,434 | 10/1967 | Beckmann et al. | 350/267 (UX) |
| 1,195,757 | 8/1916 | Wertz | 350/312 X |
| 2,381,101 | 8/1945 | Bausch | 350/57 |
| 2,974,226 | 3/1961 | Fischer | 350/312 UX |
| 2,953,970 | 9/1960 | Maynard | 350/58 |
| 3,390,931 | 7/1968 | Luning et al. | 350/57 |

*Primary Examiner*—David Schonberg
*Assistant Examiner*—Toby H. Kusmer
*Attorney*—Holcombe, Wetherill & Brisebois ABSTRACT: Light-obscuring means are provided for a telescope having internal illumination means to prevent the escape of such illumination through the eyepiece of the telescope except when an observer applies his eye to the eyepiece. In each of the examples given, an eye guard is displaceable when the observer presses his face against the eyepiece and this causes the movement of an obscuring device in the eyepiece away from a setting in which the light path through the eyepiece is closed. The eye guard and the obscuring device are subject to the action of a biassing member so that they return to their previous positions when the observer moves away from the eyepiece.

PATENTED JUL 20 1971

SIGHTING TELESCOPES WITH DISPLACEABLE EYEGUARDS

This invention relates to sighting telescopes provided with internal illumination e.g. for a sighting mark or graticule, or from an image-intensifying system.

In such internally illuminated telescopes, light passing out of the eyepiece will fall upon the observer's face when he withdraws his eye from the eyepiece. In military applications, if this occurs under battlefield conditions and when there is otherwise near total darkness, it can make use of the telescope dangerous.

According to the invention, in a telescope provided with internal illumination means and comprising an eyepiece on which is an eye guard so carried as to be displaceable from an end position against biasing means by the application of pressure to said eye guard, means being provided to prevent the emission of light from said means or graticule from the eyepiece when the eye guard is in said end position determined by the biasing means. Thus, the internal illumination cannot escape from the telescope until the eye guard is placed under pressure i.e. as the observer applies his eye to the eye guard—and as he withdraws from the instrument the illumination is again cut off while his face is still in contact with the eye guard.

Preferably, the escape of illumination is prevented by blanking means mounted within the the eyepiece to be normally held in a position in which the light path therethrough is closed off but being movable by the displacement of the eye guard so that said means are held in an open position while pressure is applied to the eye guard to keep them displaced.

The invention will now be described by way of example only and with reference to the accompanying drawings wherein.

Figure 1:
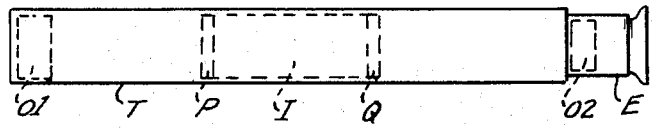
FIG. 1 is a schematic illustration of a sighting telescope having an image-intensifying system and incorporating an eyepiece according to the present invention.

Referring to FIG. 1 of the drawings, a telescope T intended for night viewing is provided with a lens system 01 receiving external illumination and forming an image of the field of view on pickup screen P of an image intensifier I. The resulting brighter image falls upon output screen Q of the intensifier and is viewed by an observer through a second lens system 02 mounted in the eyepiece E of the telescope.

It is with the construction of the eyepiece that the invention is more particularly concerned with two alternative embodiments will now be described. In each embodiment, the eyepiece comprises a barrel 2 having at one end a socket 4 which forms part of attachment means for the eyepiece to the main body of the telescope (not shown). Each barrel has a shoulder 6 which locates the optical elements (not shown) of the eyepiece which are secured by a collar (not shown) screwed into a threaded portion 8 of each barrel.

Figure 2:
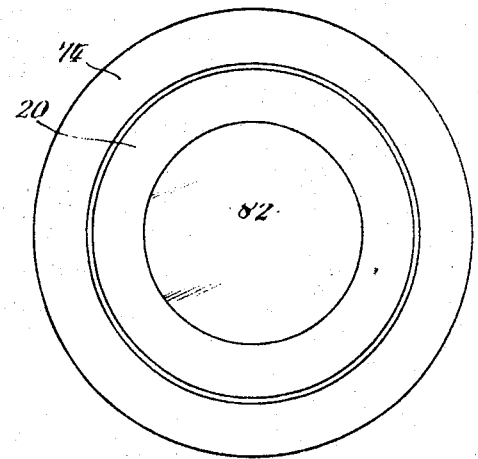
FIGS. 2 and 3 show an axial sectional view and an end elevation respectively of one form of eyepiece that can be incorporated in the telescope of FIG. 1.
Figure 3:
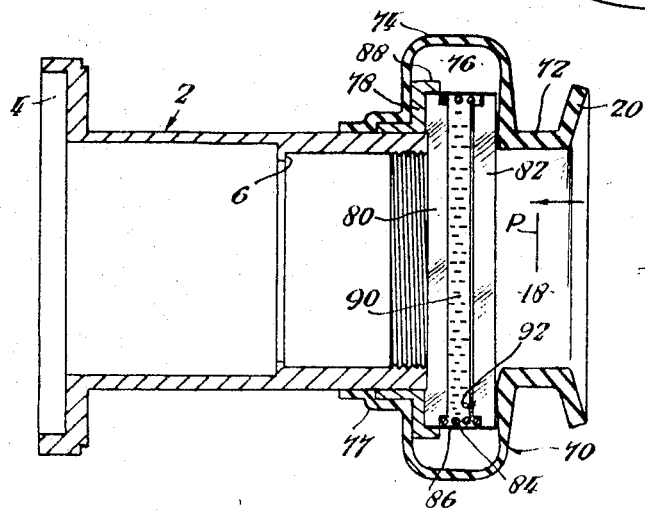

In the arrangement shown in FIGS. 2 and 3, the eyepiece has an eye guard 70 with a cylindrical portion 72 defining an aperture 18 and a rim 20 at the rear of the cylindrical portion. A wall 74 of the eye guard extends forwardly from the portion 72 and defines an annular space 76. Forward flange 77 of the eye guard is secured to the barrel and to a flanged ring 78 fixed to the barrel.

Blanking means preventing unwanted emission of light comprise tow transparent plastics discs 80 and 82 having opposed annular recesses at their peripheries in which seat respective ends of a coil spring 84 to urge the discs apart. The space between the discs is sealed by a distensible peripheral membrane 86 which is bonded to the discs. The discs are located by means of a socket formed by an axially extending flange 88 of the ring 78, and the disc 82 bears against the eye guard. The space between the discs is filled with an opaque liquid 90, and a thin spacing washer 92 lies in this space and ensures a predetermined minimum axial spacing of the discs.

Normally the discs are held apart by the spring 84 and the liquid 90 forms an effective screen against the escape of light from the eyepiece. When an observer applies his eye to the telescope the light path through the eyepiece is opened by pressure of the observer's face upon the eye guard: this causes discs 80 and 82 to be moved closer together and some of the liquid in the space between them is expelled to stretch the membrane 86 into the space 76. The washer 92 prevents wringing of the discs 80, 82 but the minimum thickness of the layer of liquid between the discs as determined by the thickness of the washer 92 is small enough to permit light to pass from the telescope through the eyepiece to the observer's eye, the position of which is denoted by the letter P.

When axial pressure is removed from the eye guard, the discs are separated by the spring 84 and the liquid flows back into the enlarged space between the discs, the increased thickness of liquid shutting off the light path to the eyepiece.

Figure 4:
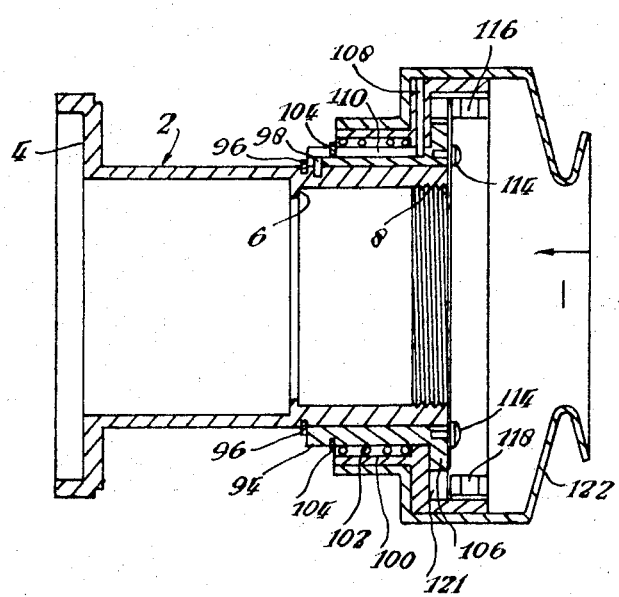
FIGS. 4 and 5 show an axial sectional view and an end elevation with the eye guard removed of an alternative form of eyepiece according to the invention.
Figure 5:
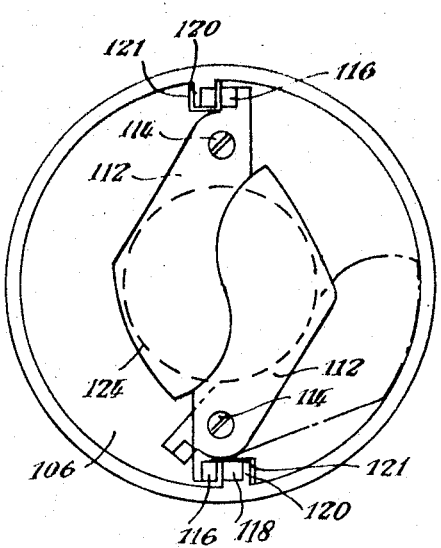

The embodiment shown in FIGS. 4 and 5 utilizes a magnetically operated shutter. The sectional view in FIG. 5 shows the device with a securing collar for the optical elements in position.

The eyepiece comprises a collar 94 which is located on the barrel 2 of the eyepiece by means of a circlip 96 and secured by a pin 98. A sleeve 100 is slidably mounted on the collar and is urged towards the right (as seen in FIG. 4) and against flange 106 of the collar by means of a coil spring 102 which bears at its other end on a circlip 104 engaged in a slot in the collar. A pin 108 protrudes inwardly from the sleeve into a slot 110 in the collar, serving to prevent relative rotation of the collar and sleeve. An eye guard 122 is mounted on the sleeve.

The shutter has two blades 112 which are pivotably mounted on the flange 106 of the collar on the shanks of set screws 114. Each of the shutter blades has a horseshoe magnet 116 secured to it, and these magnets are disposed to lie adjacent horseshoe magnets 118 secured to bosses 120 of the sleeve 100. In the position shown in FIGS. 4 and 5 the unlike poles of the respective magnets 116 and 118 are opposed and attract each other, and the shutter blades are therefore drawn inwards closing the light path through the eyepiece, the effective aperture, indicated at 124, in FIG. 5 being that of the securing collar (not shown in FIG. 4) for the eyepiece optical elements that is screwed to the threaded portion 8 of the barrel.

Axial pressure on the eye guard will move the sleeve (to the left in FIG. 4) against the force of the spring 102 to displace the magnets 118 into recesses 121 in the flange 106. This brings the like poles of the magnets 116 and 118 opposite each other and there is thus a repulsive force between them which causes the blades of the shutter to pivot to positions, similar to that shown in broken lines for the lower blade in FIG. 5, in which they no longer occlude the light path. On removal of axial pressure from the eye guard, the spring urges the sleeve back to the right, and the unlike poles of the respective magnets are again juxtaposed, resulting in closure of the shutter.

Both the described embodiments have the further advantage that the covering of the objective of the eyepiece may prevent condensation of water upon the lenses in unfavorable weather conditions, since the blanking means will tend not only to prevent the access of moist air to the lenses, but also to conserve any heat imparted by the illumination means to the eyepiece.

What I claim and desire to secure by Letters Patent is:

1. In a telescope provided with internal illumination means transmitting light to an eyepiece, the improvement consisting of an eye guard displaceably mounted at said eyepiece, biasing means urging said eye guard to an end position from which it is movable by the application of pressure when an observer looks into the telescope, shutter means being arranged in the telescope between the internal illumination means and the eye guard, said shutter means comprising at least one rigid blade mounted for movement in a direction transverse to the direction of movement of the eye guard, magnet means connected for displacement with movement of the eye guard, said magnet means comprising respective elements fixed relative to said at least one blade and to the eye guard in positions such that relative movement occurs between said elements with displacement of the eye guard from said end position, and said relative movement displaces said at least one blade in said transverse direction, from a position in said light path occupied when the eye guard is in said end position and in which said at least one blade prevents the omission of light from the eyepiece, to a position outside said light path reached when said eye guard is moved away from said end position.